United States Patent [19]

Wiley, Jr.

[11] Patent Number: 4,919,472
[45] Date of Patent: * Apr. 24, 1990

[54] ROOFTOP DRAG REDUCING DEVICE FOR MULTI-TRUCK SHIPMENT WHEN MOUNTED

[75] Inventor: Nathaniel C. Wiley, Jr., Weston, Conn.

[73] Assignee: Airshield Corporation, Bridgeport, Conn.

[*] Notice: The portion of the term of this patent subsequent to Nov. 15, 2005 has been disclaimed.

[21] Appl. No.: 270,944

[22] Filed: Nov. 14, 1988

Related U.S. Application Data

[63] Continuation of Ser. No. 926,892, Nov. 4, 1986, Pat. No. 4,784,424.

[51] Int. Cl.⁵ .............................................. B62D 35/00
[52] U.S. Cl. ................................... 296/180.2; 296/180.3
[58] Field of Search ........................................ 296/180.2

[56] References Cited

U.S. PATENT DOCUMENTS

| | | | |
|---|---|---|---|
| 3,514,023 | 5/1970 | Russell et al. | 296/180.2 |
| 4,006,931 | 2/1977 | Groves | 296/180.2 |
| 4,082,340 | 4/1978 | Taylor | 296/180.2 |
| 4,082,341 | 4/1978 | Gorl | 296/180.2 |
| 4,102,548 | 7/1978 | Kangas | 296/180.2 |
| 4,141,580 | 2/1979 | Ivan | 296/180.2 |
| 4,156,543 | 5/1979 | Taylor et al. | 296/180.2 |

FOREIGN PATENT DOCUMENTS

| | | | |
|---|---|---|---|
| 3213820 | 10/1983 | Fed. Rep. of Germany | 296/180.2 |
| 2098152 | 11/1982 | United Kingdom | 296/180.2 |
| 3136362 | 9/1984 | United Kingdom | 296/180.2 |

*Primary Examiner*—Robert R. Song
*Attorney, Agent, or Firm*—Mark P. Stone

[57] ABSTRACT

The rooftop drag reducing device comprises a top and a bottom and may be mounted to the cab of trucks for semi-trailers at the factory. The device may then be conveniently collapsed with the top fitting inside the bottom when multiple trucks are shipped with the second and third truck, for example, having their front wheels mounted to the fifth wheel of the truck in front of them. Since the drag reducing device has had its height reduced it will pass under low bridges.

The device is initially integrally molded in one piece and cut into the top and bottom portions along a oblique cut line step. The top may be left connected to the bottom at the front to form a living hinge. Alternatively, a piano hinge may be used to connect the top and bottom portions at the front thereof. Bolts along the sides are used to hold the top in its upright position. These bolts pass through stepped side flanges which strengthen the device.

The rear of the top is closed to form a rigid box-like structure to resist sway.

Trim tabs may be integrally molded into the top at its rear. Each trim tab is preferably only cut out three quarters around its perimeter so that it remains mounted at the front thereof to the top by a living hinge of molded material. The device may be mounted to the roofs of truck cabs by conventional brackets or by means of bolts through an integral horizontally disposed flange around its lower periphery.

17 Claims, 14 Drawing Sheets

ROOFTOP DRAG REDUCING DEVICE FOR MULTI-TRUCK SHIPMENT WHEN MOUNTED

This application is a continuation of Ser. No. 06/926,892 filed Nov. 4, 1986, U.S. Pat. No. 4,784,424.

TECHNICAL FIELD

This invention relates to rooftop drag reducing devices for multi-truck shipment when mounted. More particularly, it relates to such devices that are integrally molded in one piece, cut into two sections such that the top section may be lowered during multi-truck shipments, so that the top of the device may pass safely under low bridges. The top section may also be lowered during towing.

The top and bottom are preferably left connected at the front of the device at a living hinge.

The invention also provides integrally molded trim tabs which may be mounted along their forward edges to the device by a living hinge.

BACKGROUND OF THE INVENTION

Rooftop drag reducing devices have come into widespread use on trucks, particularly on trucks having fifth wheels pulling semi-trailers. These devices direct the air passing over the top of a truck in such a way that the wind hitting the flat front of the trailer being pulled is minimized. A major practical problem with these devices has been that the majority of them in use are molded in one piece, usually of fiber glass reinforced plastic. The devices cannot be mounted to the trucks at the factory, as the trucks are shipped multiply with the second and third truck, for example, having their front wheels mounted to the fifth wheel of the preceding truck. This raises the drag reducing devices on the second and third trucks and following trucks to heights that are greater than low bridges that the trucks have to go under during shipment. For this reason the majority of drag reducing devices are shipped to the truck dealer, usually unpainted. They are painted by the truck dealer to match the truck on which they are to be mounted and then mounted to the truck by the truck dealer. Since this is done at the truck dealer's job shop, it is a more expensive procedure than would be encountered in painting and mounting the devices at the factory. An additional problem encountered is that some truck dealers substitute drag reducing devices not approved by the factory, which may not provide the drag reduction of the factory devices and may be subject to structural failure during use. The factory approved devices are highly engineered and tested to provide the maximum possible drag reduction for the particular truck model for which they are designed and are subjected to life tests and designed against structural failure for the lifetime of the truck. Another problem encountered with prior art one-piece devices is that they are too high for conventional towing when the truck breaks down.

Certain prior art rooftop drag reducing devices have been provided with collapsible features in an attempt to overcome these problems. However, they have been relatively expensive and subject to other forms of failure. For example, inflatable devices have been proposed, but these have not gained widespread acceptance because of their increased cost; the additional equipment required to inflate and deflate them; and, their being subject to tears and leaks. Other devices have been proposed but have not come into widespread use such as a two piece device where the top may be brought down with its sides outside the lower portion of the device. Such devices have the disadvantage of requiring supplementary support struts (or sway braces) to resist side loads imposed by wind buffeting and cab movement. This has been brought about by the fact that previous designs have been comprised of an inclined front-top, and two sides, but no rear surface to resist sway.

Generally, prior art devices have had top portions which either overlap bottom portions or folding plates or bellows. In all cases these designs have required various types of sway-bracing as well as some type of lifting and support hardware to keep the upper portion in position for its operating mode. These requirements have added substantial cost, weight, and complexity, and engendered reliability problems in the aerodynamic devices. The increased weight requires increased structure in the cab roof and supporting portions of the truck. This greatly increases the weight of the truck and thus reduces fuel economy.

In addition to the parts required to resist the various loads imposed on the device, the device itself has generally required a number of individual molded and fabricated components: top portions, side portions, folding plates, bellows, etc. It should be borne in mind that ideally a different device must be provided, matched to each truck model of each manufacturer. Multi-part devices at least double the manufacturer's mold cost.

In some cases such designs have had to be removed from the market because of structural failures; others have been discarded in the development and prototype phase as being impractical.

DISCLOSURE OF THE INVENTION

Rooftop drag reducing devices according to the invention are integrally molded, from a single piece of fiber glass reinforced plastic, for example. The top portion of the structure is narrower than the bottom portion of the structure and they are connected by an oblique cut line which is cut away to form the two pieces of the final structure.

The device is cut along the cut line and the front of the top is mounted to the front of the bottom by means of a piano hinge. The top will now lower into the bottom portion for shipment. At the dealer, bolts are inserted through mating holes in the top and bottom portions along the sides to permanently mount the top in its upright position.

Integral trim tabs may be molded into the device, again saving any costs of an additional mold. The trim tabs are cutout along the rear and sides thereof, but may be left permanently attached along the front thereof. This attachment may be used as a living hinge. The trim tabs are pulled out to various positions to adjust for various trailer heights and widths.

The top of the device is structurally rigidized by being closed along the top rear to provide structural rigidity. An additional fold line along the top and the bottom provides flanges for connecting bolts and rigidizes each portion of the device. A peripheral flange is integrally molded along the front and sides at the bottom of the device. This flange rigidizes this portion of the device and may be utilized for direct bolt mounting of the device to the roof of a cab. Alternatively, the device may be mounted by conventional light weight mounting hardware.

OBJECTS OF THE INVENTION

It is therefore an object of the invention to provide rooftop mounted drag reducing devices for trucks.

Another object of the invention is to provide such devices which are adapted for multi-truck shipment when mounted and for towing.

A further object of the invention is to provide a simple two-piece device of the above character providing for a maximum reduction in height.

Still another object of the invention is to provide such devices provided with trim tabs.

Yet another object of the invention is to provide such devices which do not require additional reinforcement or bracing.

A further object of the invention is to provide such devices which are self-rigidized and require only light weight mounting hardware.

Yet a further object of the invention is to provide such devices that may be integrally molded from a single mold.

Still a further object of the invention is to provide such devices having one or more trim tabs integrally mounted thereto by a living hinge.

Still yet other objects of the invention are to provide devices accomplishing the above objects characterized by low cost, low weight, ease of mounting to a vehicle, non-interference with vehicle operation, and compliance with legal requirements.

Other objects of the invention will in part be obvious and will in part appear hereinafter.

The invention accordingly comprises apparatus involving features of construction, elements, and arrangements of parts and articles of manufacture possessing features, properties, and relations of elements, all of which will be exemplified in the following detailed description. The scope of the invention is indicated in the claims.

BRIEF DESCRIPTION OF THE DRAWINGS

For a fuller understanding of the nature and objects of the invention, reference should be had to the following detailed description, taken in connection with the accompanying drawings in which.

The same reference characters refer to the same elements throughout the several views of the drawings.

DETAILED DESCRIPTION OF THE INVENTION

Figure 1:
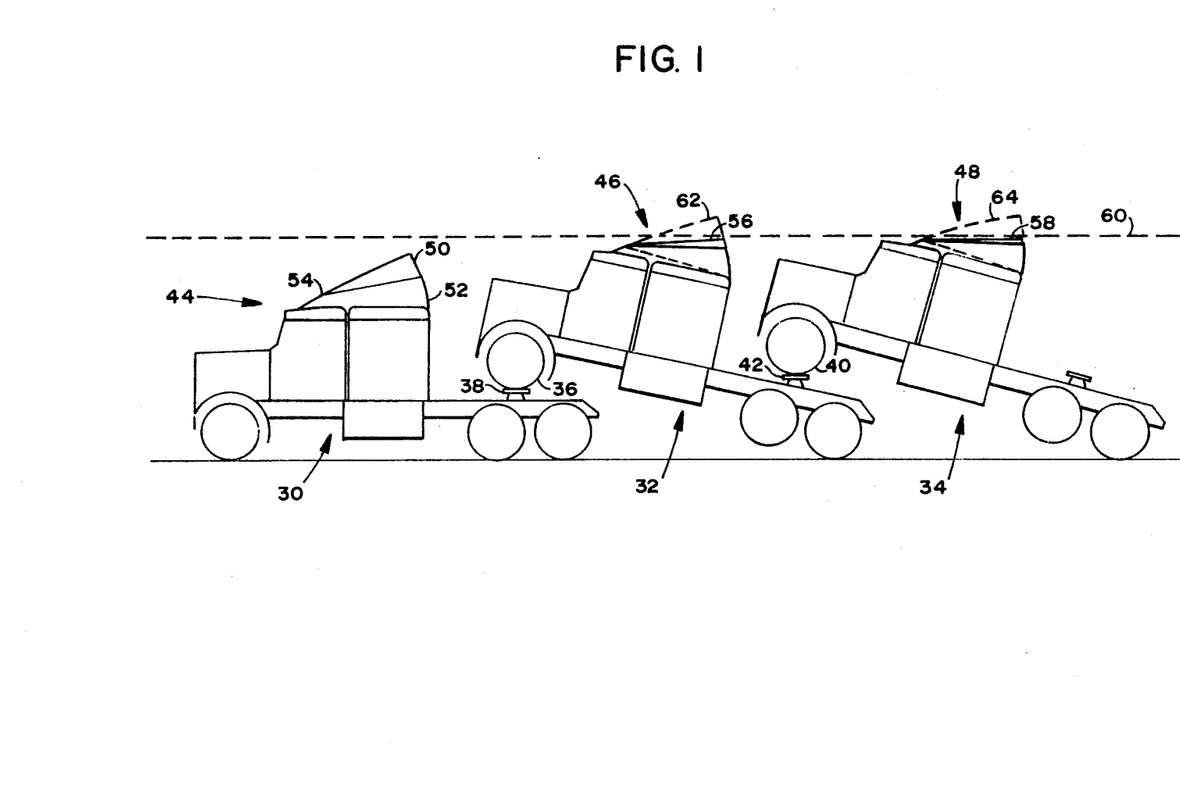
FIG. 1 is a diagram illustrating how the device according to the invention may be folded down when mounted to the tops of cabs of trucks in transit to lower the total height of the trucks.

Now referring to FIG. 1, trucks for semi-trailers are shipped from the factory in multiples, such as the three trucks 30, 32, and 34. The front wheels 36 of the truck 32 are mounted to the fifth wheel 38 of the truck 30 and the front wheels 40 of the truck 34 are mounted to the fifth wheel 42 of the truck 32.

As can be seen in FIG. 1, this form of shipment raises the height of the cabs of the trucks 32 and 34 and an aerodynamic device according to the invention is mounted to each of the trucks; namely devices generally indicated at 44, 46, and 48. Each device is provided with top and bottom portions such as top portion 50 and bottom portion 52 of device 44. The top and bottom portions 50 and 52 are articulated where they join at the front, e.g. along line 54 of device 44. In devices 46 and 48 the top portions 56 and 58 have been lowered so as to lower the total height of the three trucks as indicated by upmost height line 60. Otherwise the top portions 62 and 64 of devices 46 and 48 would extend above the upmost height line 60 as shown by the dotted lines.

Figure 2:
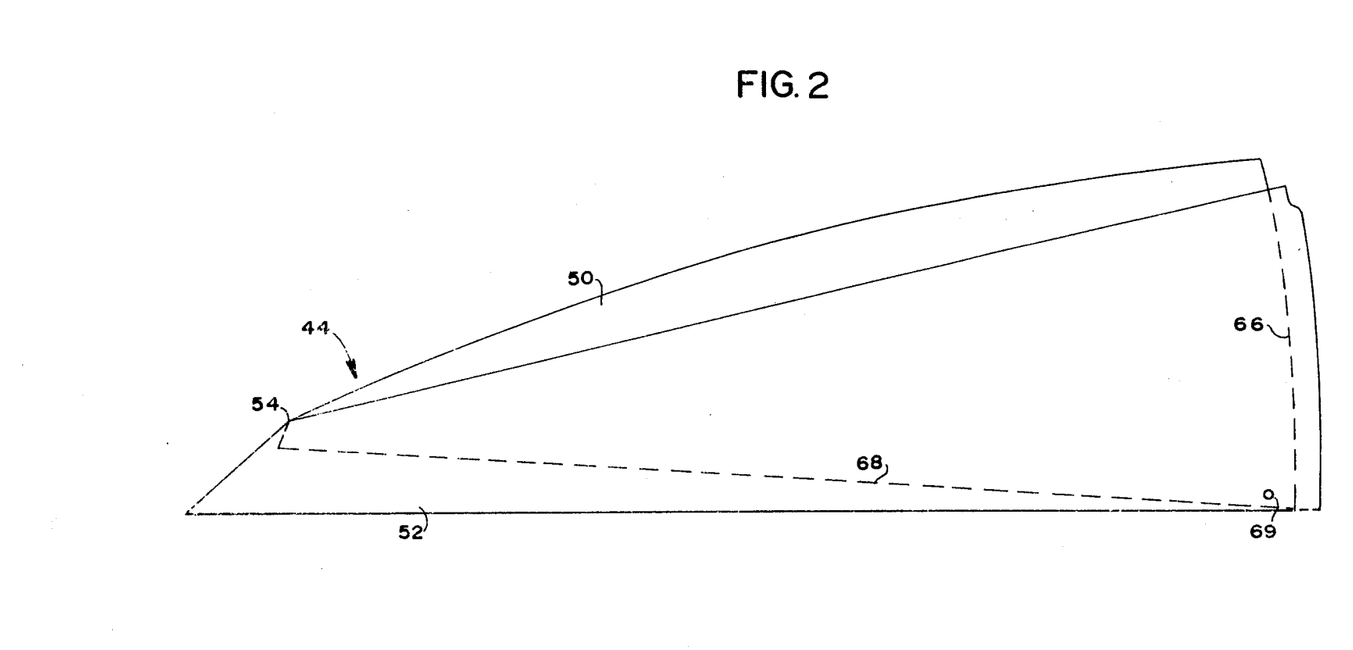
FIG. 2 is a side view of a device according to the invention, folded down for shipment.

FIG. 2 illustrates a device 44 according to the invention comprising a bottom portion 52 and a top portion 50 which are articulated along line 54 perpendicular to the page of the drawing. Top portion 50 is shown articulated down to its lowermost position with the back 66 and bottom 68 of the top 50 illustrated by dotted lines. The parts 50 and 52 illustrated in FIG. 2 may be joined by a piano hinge (not shown) at line 54. During shipment they may be bolted together at mating holes 69.

Figure 3:
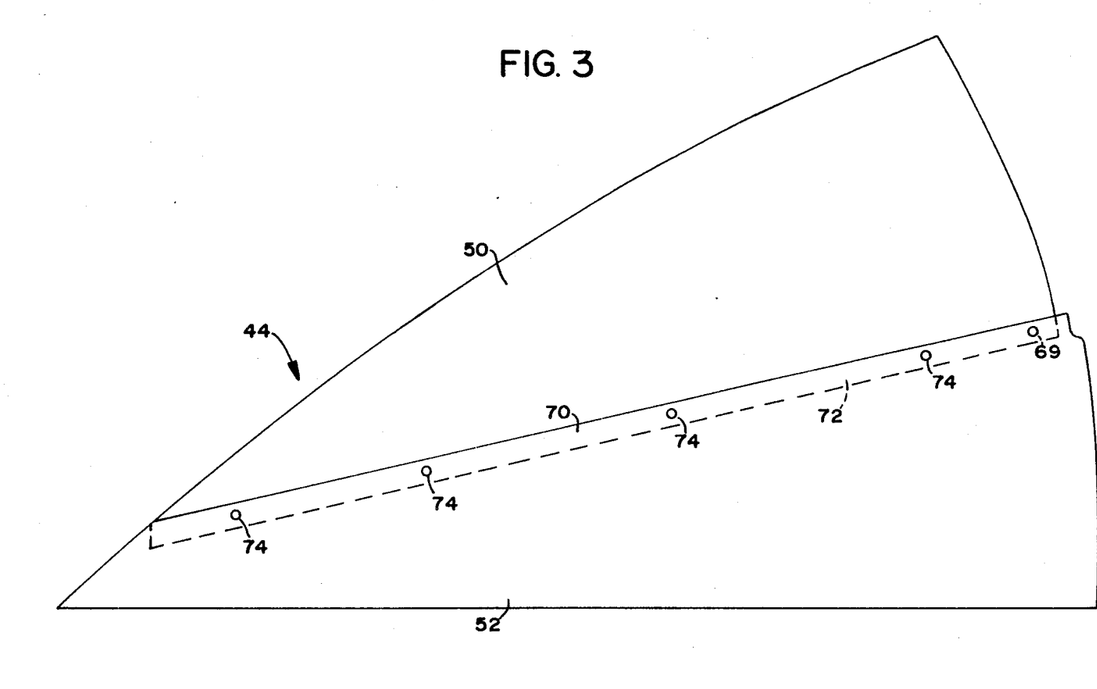
FIG. 3 is a side view of the device shown in FIG. 2 with the top thereof in its uppermost position for use as a drag reducing device.
Figure 4:
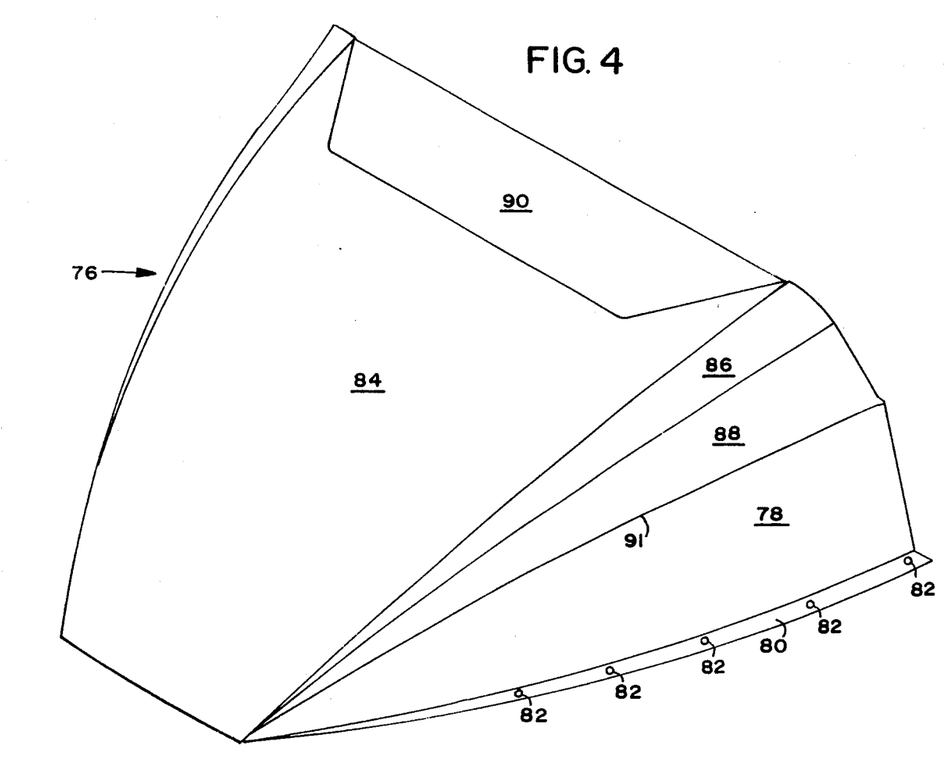
FIG. 4 is a perspective view of a device according to the invention.

As shown in FIG. 3, the device according to the invention generally indicated at 44 has the top 50 raised to its upmost position with respect to the bottom 52, after the truck is delivered to the dealer, for its drag reduction use. A flange portion 70 on the bottom portion 52 and a flange portion 72 on the upper portion 50 overlap to provide mating bolt holes 74.

Figure 5:
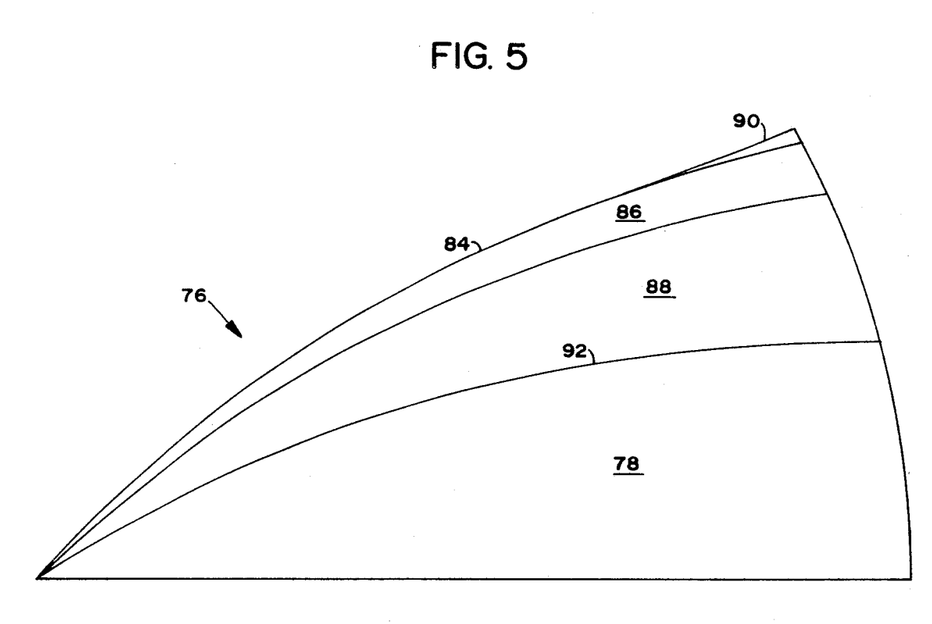
FIG. 5 is a side view of the device of FIG. 4.

The embodiment of the invention generally indicated at 76 illustrated in FIGS. 4 through 7 illustrate several additional features of the invention. The bottom portion 78 is provided with a horizontally disposed flange 80 which may be provided with bolt holes 82 for mounting the device to the top of the truck. The top portion 84 is preferably curved at portion 86 to reduce the generation of vortices between the juncture of the upstanding portion 88 of the top and the generally horizontally disposed upper surface of the top 84. Portion 90 may be formed in the top 84 to form a horizontal adjustable trim tab. The device is preferably molded in one piece and cut along line 91 to form the top 84 and the bottom 78. In FIG. 5 the trim tab 90 is shown articulated up from the horizontal portion 84 of the top which comprises portions 84, 86, and 88.

Figure 6:
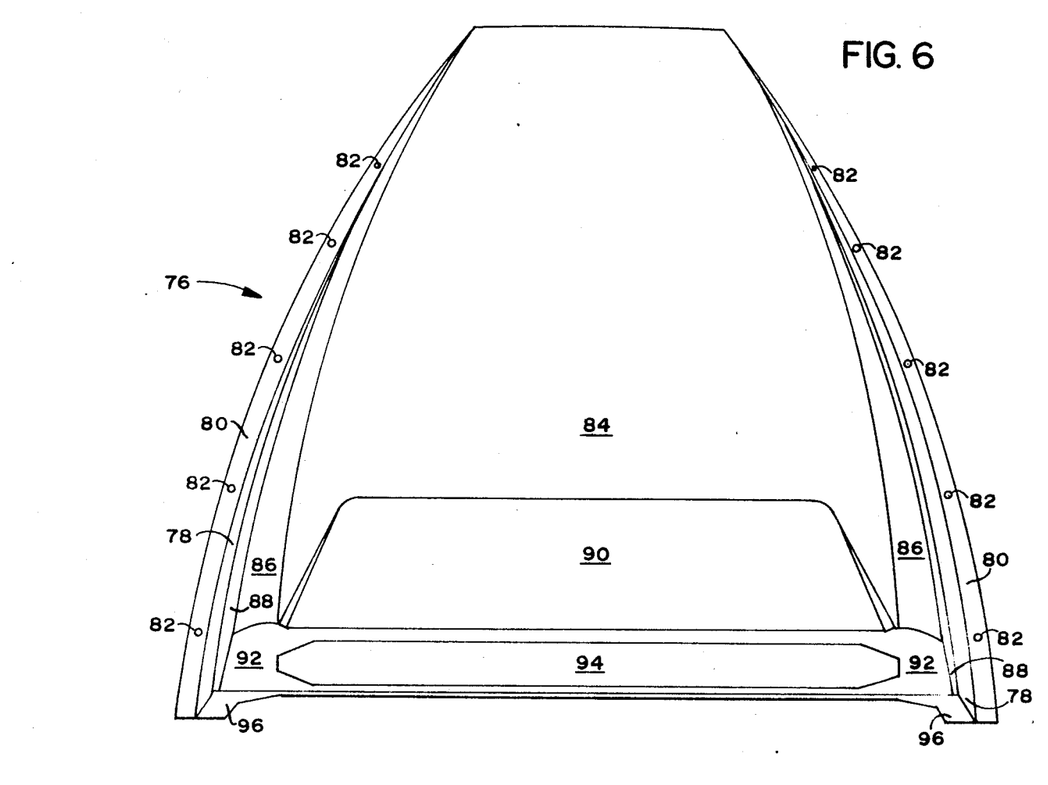
FIG. 6 is a top view of the device of FIG. 4.
Figure 7:
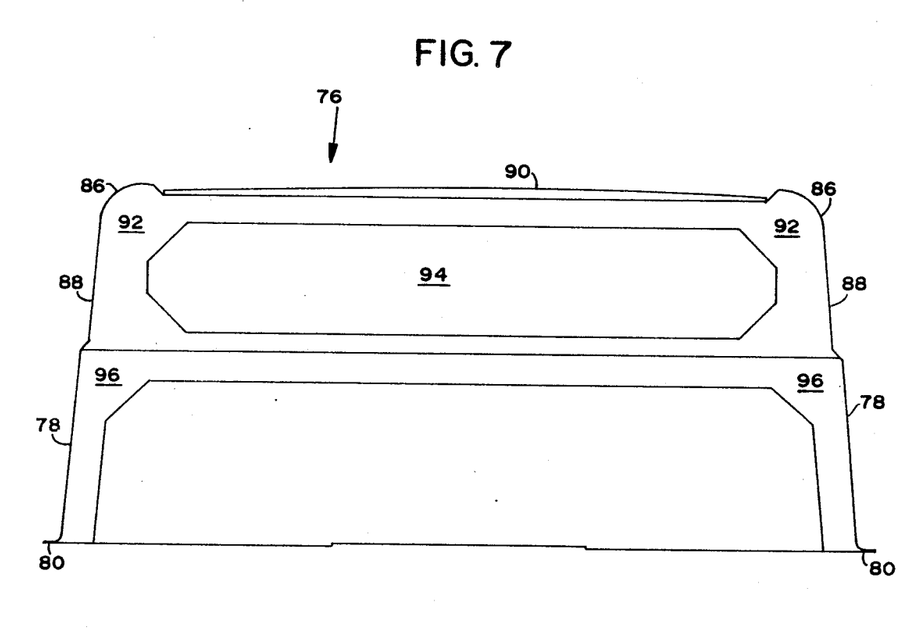
FIG. 7 is a back view of the device of FIG. 4.

Now referring to FIGS. 6 and 7, the top 84 is preferably provided with a flat back panel 92 which is provided with an indented panel 94 which rigidizes and reinforces the back panel 92 and strengthens the top 84 against sway. Similarly, the bottom 78 is provided with a U-shaped back flanged portion 96 which strengthens the bottom portion of the device.

Figure 8:
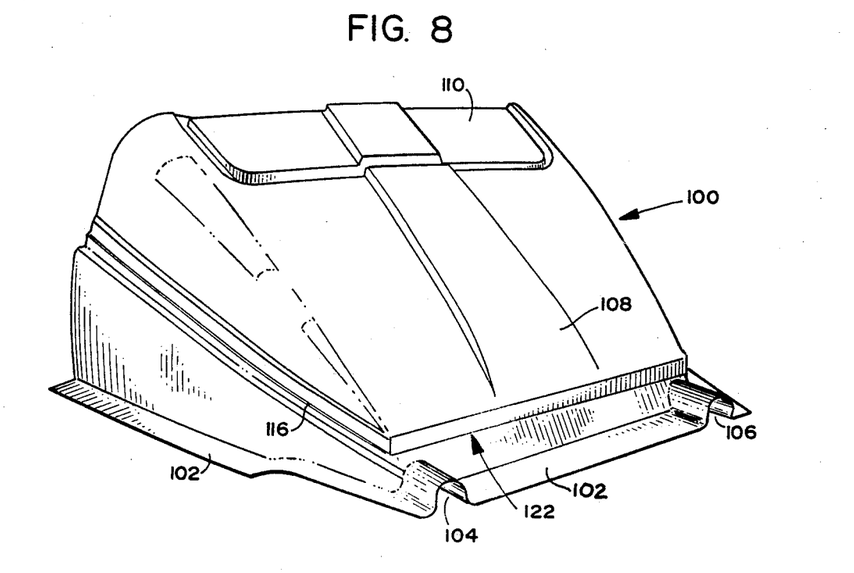
FIG. 8 is a photograph of another device according to the invention before it has been cut into its several operating parts.
Figure 9:
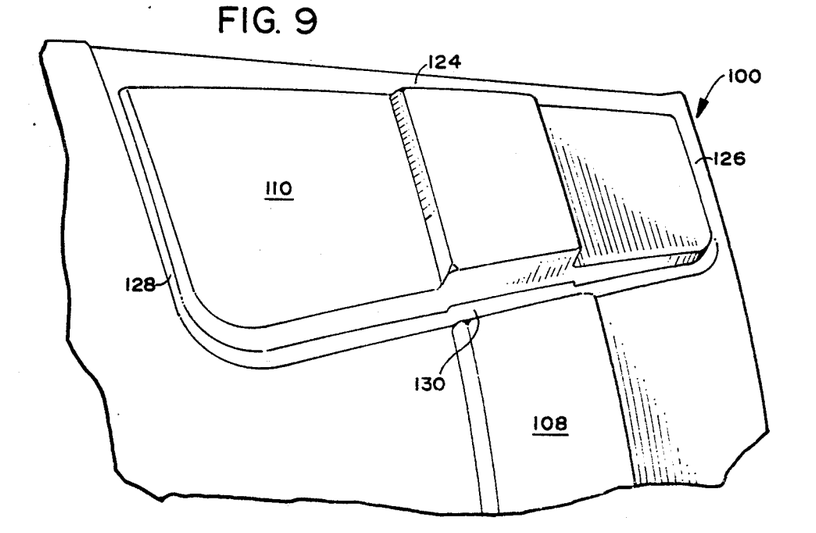
FIG. 9 is a photograph showing the integrally molded top trim tab of the device of FIG. 8.
Figure 10:
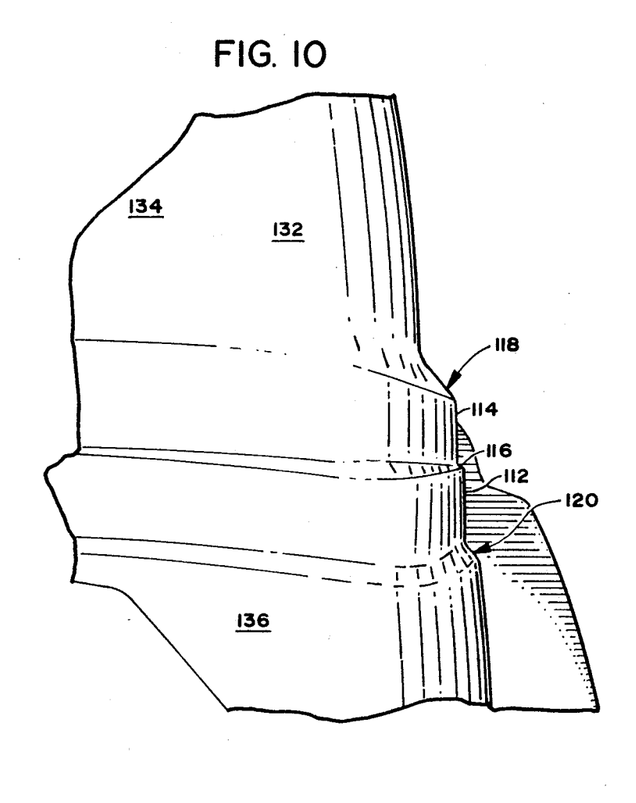
FIG. 10 is a photograph showing the reinforced flanges and the oblique cut line connection therebetween which is cut away to form the top and bottom portions of the device of FIG. 8.
Figure 11:
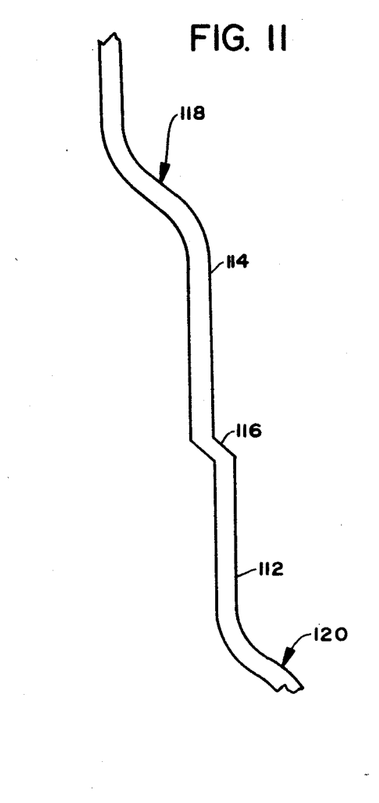
FIG. 11 is a partial cross sectional view of the flanges and cut line of FIG. 10.
Figure 12:
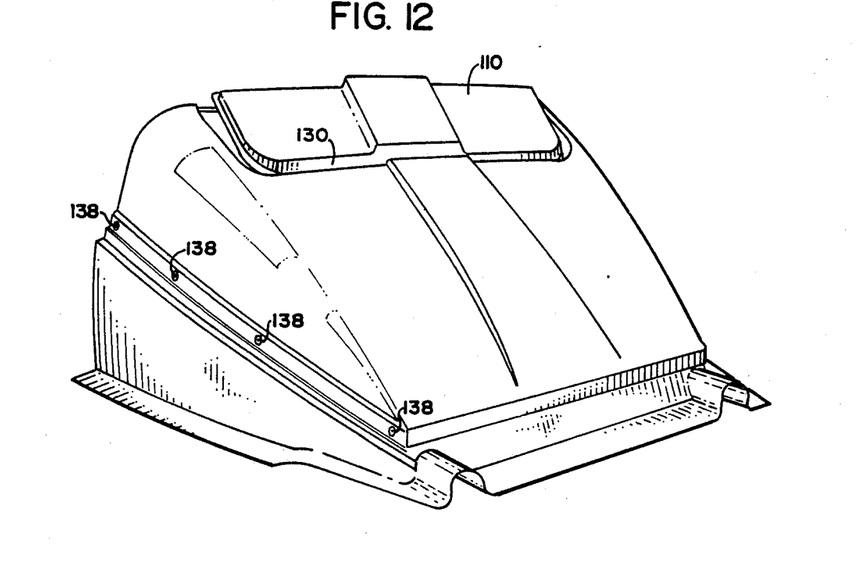
FIG. 12 is a photograph of the device of FIG. 8 after the parts have been cut and the top bolted to the bottom.
Figure 13:
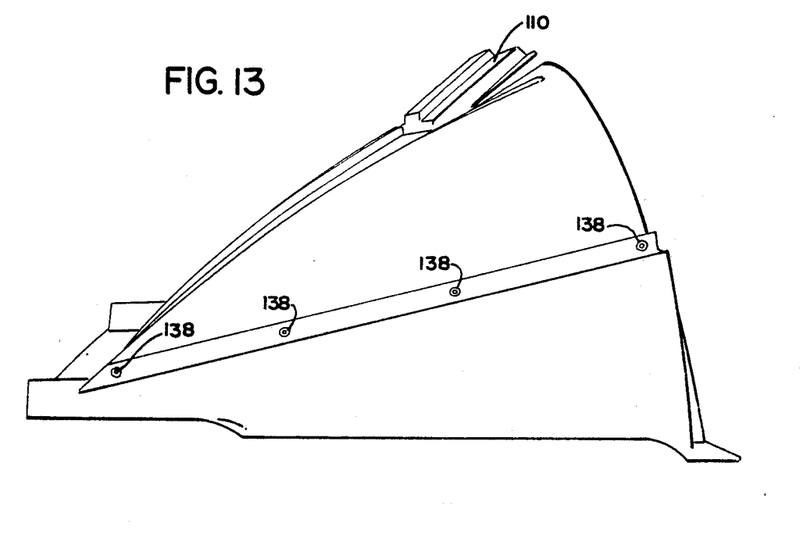
FIG. 13 is a side photograph of the device illustrated in FIG. 12.

An integrally molded device according to the invention is illustrated in FIGS. 8 through 15. The device 100 is shown in FIGS. 8, 9 and 10 as it comes off the mold. It is provided with a generally horizontally disposed bottom flange 102 which may be provided with openings such as at 104 and 106 for cab roof mounting. It may be provided with various forms of styling devices such as illustrated at 108, which may be formed to also strengthen the device. A horizontal trim tab 110 is shown integrally formed with the device 100.

As best shown in FIG. 10, the device is preferably formed with a inwardly disposed flange portion 112 on the bottom portion thereof, and an outwardly disposed flange portion 114 on the top portion thereof, and an oblique part line cut portion 116 which is cut away so as to form the top and bottom portions of the device. Those skilled in the art will understand how the curved portions illustrated at 118 and 120 strengthen the upper periphery of the bottom of the device and the lower periphery of the top of the device.

Preferably the oblique part line cut portion 116 is cut along the sides and rear only, leaving an integral living hinge portion generally indicated at 122 for articulating the top portion into the bottom portion. Alternatively, the portion 122 may be cut horizontally and provided with a piano hinge for articulation. Similarly, it is preferable that the structure be cut along three sides of the trim tab 110, namely along the rear at 124 and along the sides at 126 and 128, so that a living hinge is formed along the front portion 130. In FIG. 10 the back panel 132 and recess panel portion 134 of the top of the device may be seen, as well as the U-shaped back panel portion 136 of the bottom portion of the device.

Those skilled in the art will understand that mating holes are drilled in portions 112 and 114 for mounting bolts to mount the top in its upmost position and that the lower horizontal peripheral flange 102 may have its width reduced by cutting it and holes drilled therein for mounting the device. Alternatively, the device may be mounted by conventional bracket structures.

Figure 14:
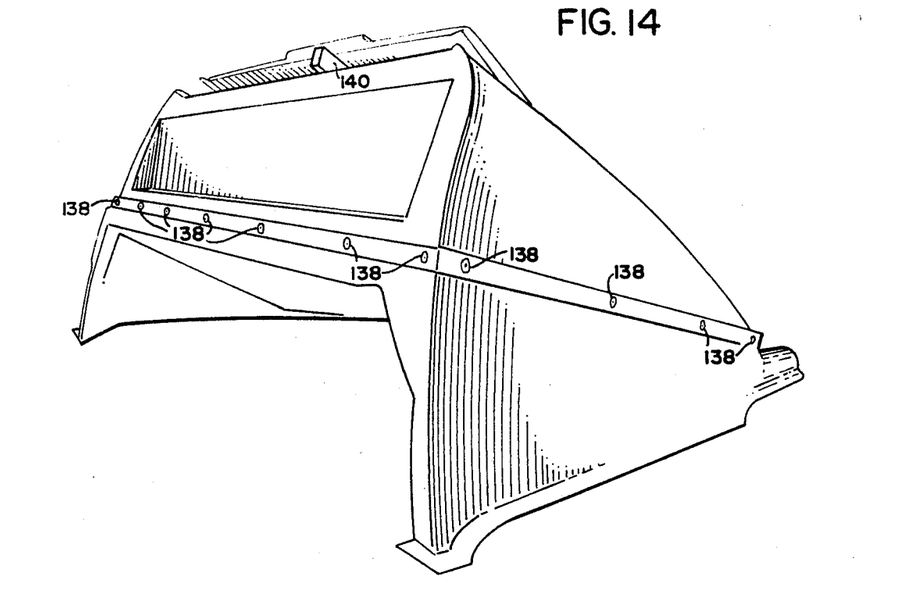
FIG. 14 is a perspective back photograph of the device of FIG. 12.
Figure 15:
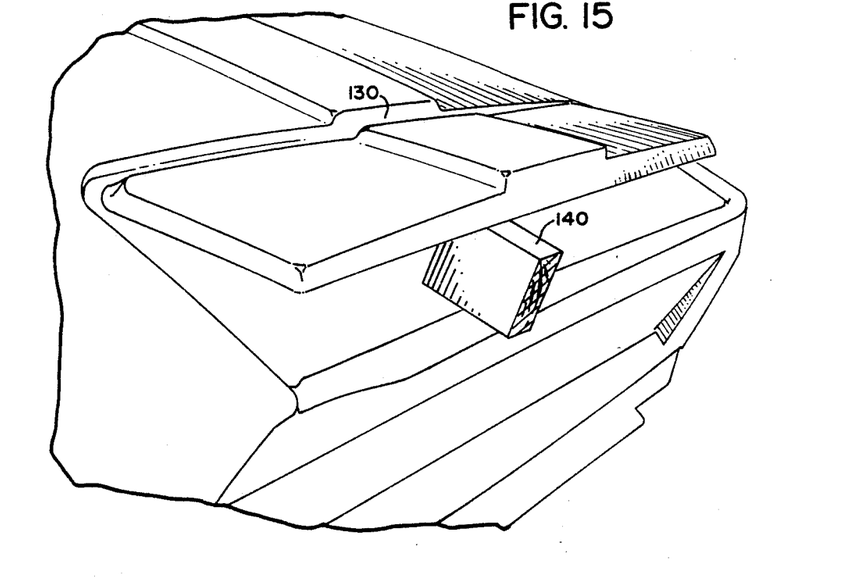
FIG. 15 is a photograph of the trim tab with the integral living hinge of the device of FIG. 12.

Specifically referring to FIGS. 12 through 15, after cutting and mounting on the truck, the bolts 138 may be installed and the horizontal adjustable trim tab 110 adjusted to appropriate height articulating it along the living hinge 130. Although a block of wood 140 is shown in FIG. 14 and 15, preferably this is accomplished by metal bracketry (not shown) attached to the trim tab 110 and the upper rear panel 132.

Figure 16:
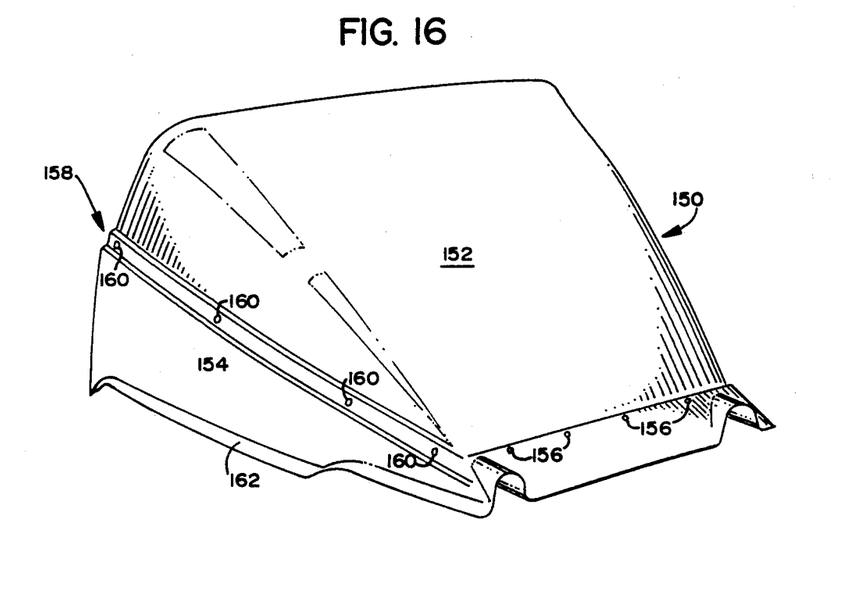
FIG. 16 is a photograph of an alternative device according to the invention with no trim tab.
Figure 17:
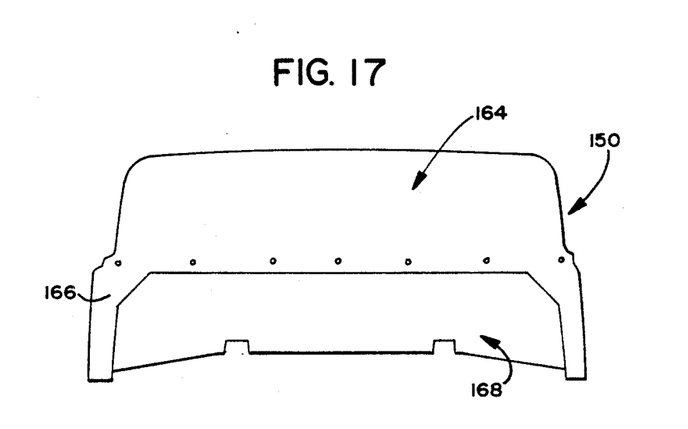
FIG. 17 is a rear view of the device of FIG. 16.
Figure 18:
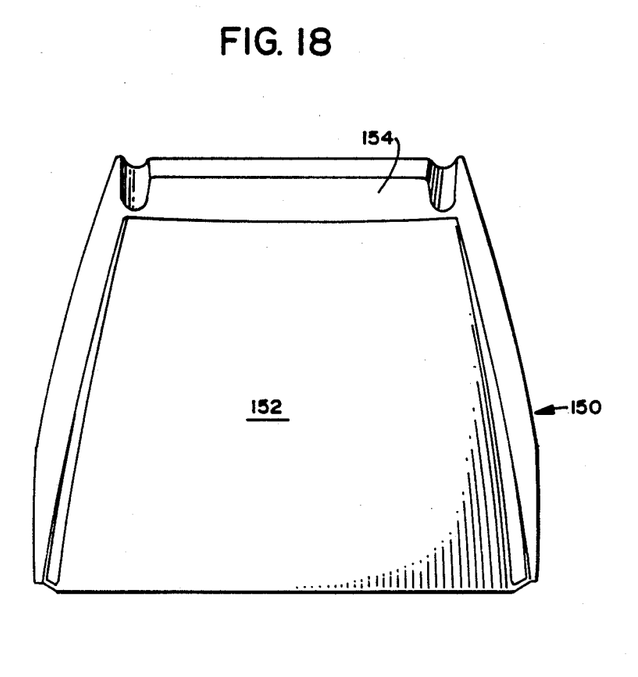
FIG. 18 is a top view of the device of FIG. 16.

FIGS. 16, 17 and 18 illustrate an alternative form of the device according to the invention which does not have a trim tab. The device generally illustrated at 150 comprises top portion 152 and bottom portion 154 jointed by a piano hinge (not shown), mounted by means of bolts 156. Again the top and bottom portions 152 and 154 are joined at mating, strengthening, flanges generally indicated at 158 by means of bolts 160. The device is provided with a lower generally horizontally disposed peripheral flange portion 162 about three sides thereof. The rear of the top portion generally indicated at 164 is provided with strengthening contoured portions and the rear of the lower portion is provided with a U-shaped flange 166. The rear of the lower portion is provided with an opening generally indicated at 168 to provide access for roof mounted devices that may project inside the aerodynamic device 150 according to the invention.

Now referring to FIGS. 19 through 24, it is critical to have the folded down aerodynamic device provide the lowest possible height off the cab roof in shipping and towing. On the other hand it is critical to have the drag reducing device provide the highest possible height in its operational mode to provide good aerodynamics. Furthermore, it is aerodynamically beneficial to provide a generous radius at the juncture of the top portion of the top surface and the side wall surfaces.

Figure 19:
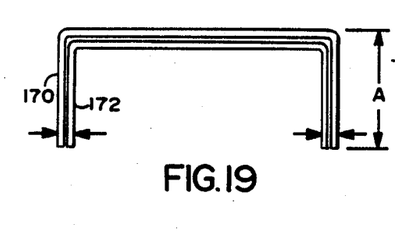
FIGS. 19 through 24 are diagrammatic rear views of collapsible devices illustrating the great advantage in having the top collapse into the bottom portion.
Figure 20:
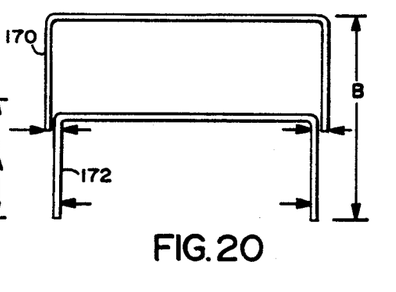

FIGS. 19 and 20 illustrate how a top portion 170 and 172 having little or no curvature at their intersection, may provide for a minimum height A and a maximum height B when bolted in the positions shown by the arrows.

Figure 21:
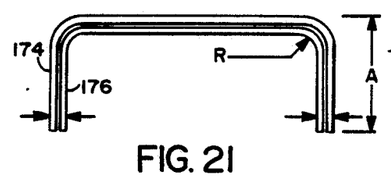
Figure 22:
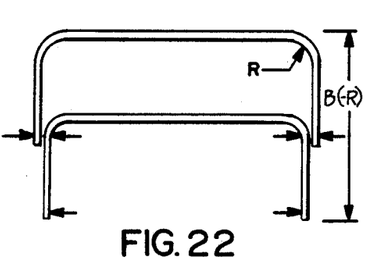

FIGS. 21 and 22 illustrate a folding aerodynamic device having a top portion 174 and a bottom portion 176 and a generous curve connecting the horizontal and vertical portions thereof reduces the maximum height B by the radius of curvature R provided between the top and bottom portions when the top 174 is outside the bottom 176.

Figure 23:
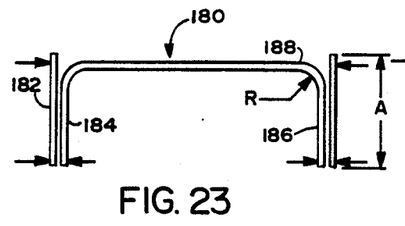
Figure 24:
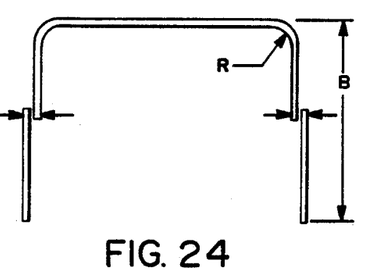

FIGS. 23 and 24 illustrate how, with a generously rounded corner top portion 180 mounted inside a generally straight sided lower portion 182, maximum and minimum heights B and A respectively may be achieved even though a generous radius of curvature R is provided between the upstanding sides 184 and 186 of the top portion and the top surface 188 thereof.

Those skilled in the art will understand that the devices of the invention illustrated herein may be provided with side trim tabs which may be bolted to the rear of the device as are certain of such trim tabs in the prior art, or may again be integrally formed with the device and mounted thereto preferably by living hinges.

The devices of the invention are preferably molded of an engineering plastics material such as fiber reinforced plastic wherein the fiber may be fiber glass or the like.

It will thus be seen that the objects set forth above, among those made apparent from the preceding description, are efficiently attained, and since certain changes may be made in the above described apparatus and articles without departing from the scope of the invention, it is intended that all matter contained in the above description shall be interpreted as illustrative and not in a limiting sense. It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A drag reducing device comprising:
   (A) a bottom portion adapted for rigid mounting on the roof of a vehicle; and (B) a top portion hingedly mounted along the front thereof to the front of said bottom portion and adapted to be articulated into said bottom portion.

2. The device defined in claim 1 wherein said top and bottom portions are formed integrally of the same material and are cut to provide for said articulation.

3. The device defined in claim 2 wherein said top and bottom portions are joined by a living hinge of said material.

4. The device defined in claim 3 wherein said material is fiber reinforced plastic.

5. The device defined in claim 1 wherein the rear of said top portion is closed to form a box-like structure.

6. The device defined in claim 1 wherein said top and bottom portions are each provided with an offset mating flange whereby they may be held together.

7. The device defined in claim 1 where said bottom portion is provided with a horizontal peripheral flange.

8. The device defined in claim 1 where said top portion is provided with upstanding sides and a horizontally disposed top surface joined by gently curved portions.

9. The method of making a drag reducing device for roof mounting on a vehicle comprising the steps of:
(A) integrally forming the device in one piece; and,
(B) cutting the device to form at least one articulated portion thereof.

10. The method of claim 9 wherein said pieces comprise a top and a bottom portion.

11. The method of claim 10 wherein said pieces comprise a fixed shape and at least one trim tab.

12. The method of claim 9 wherein said pieces comprise a fixed shape and at least one trim tab.

13. The method of claim 9 wherein at least two of said portions are articulated at a living hinge integrally formed therebetween.

14. A drag reducing device comprising:
(A) a bottom portion adapted for rigid mounting on the roof of a vehicle without external mounting means; and
(B) a top portion hingedly mounted along the front thereof to the front of said bottom portion and adapted to be articulated into said bottom portion.

15. The device defined in claim 1 wherein at least one of said top and bottom portions has at least a partial closure on the rear end thereof.

16. The method as claimed in claim 10 wherein at least one of said top and bottom portions has at least a partial closure on the rear end thereof.

17. The device as claimed in claim 14 wherein at least one of said top and bottom portions has at least a partial closure on the rear end thereof.

* * * * *